Patented July 3, 1951

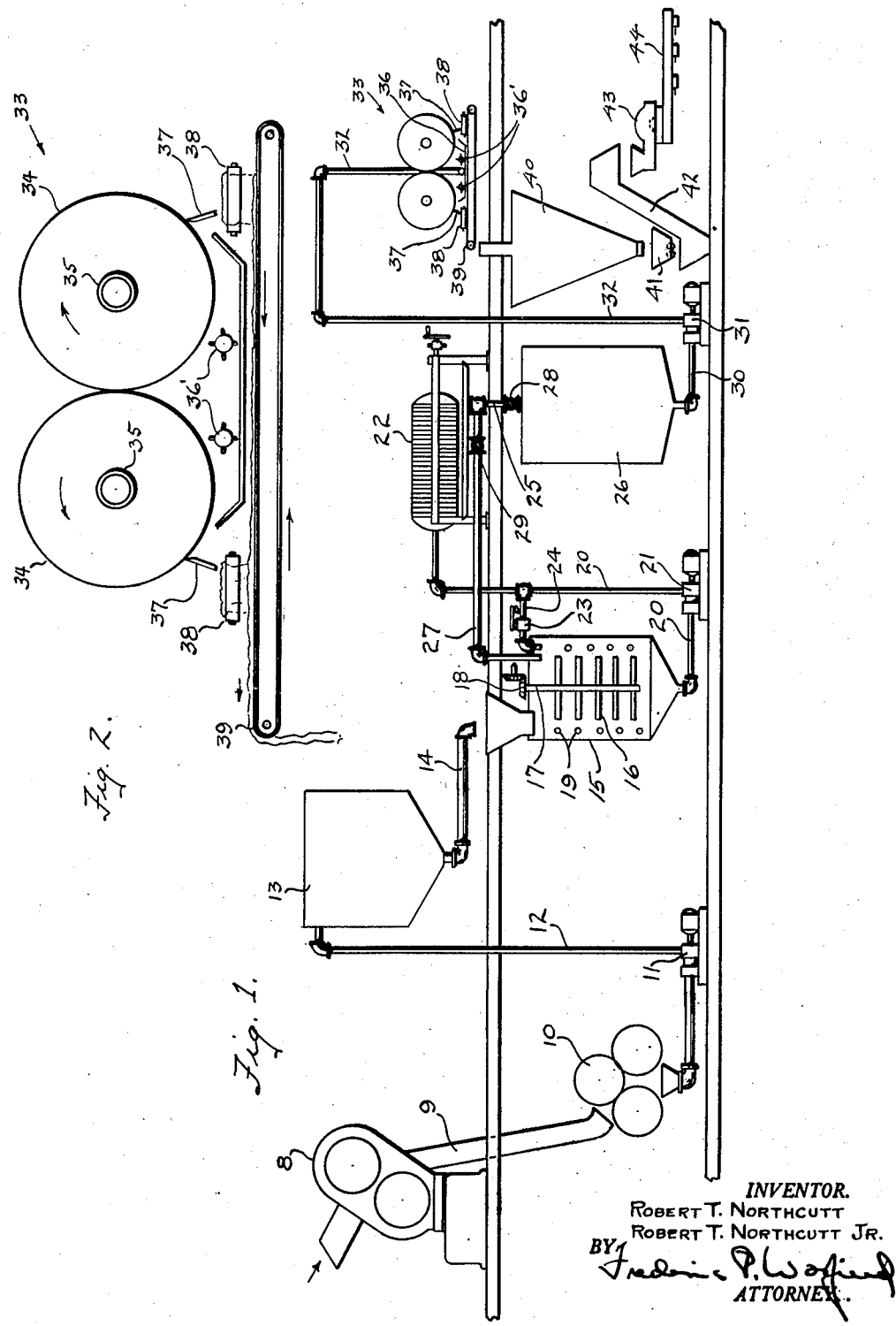

2,558,775

UNITED STATES PATENT OFFICE 2,558,775

PROCESS FOR TREATMENT OF SUGAR

Robert Thomas Northcutt, Westfield, and Robert Thomas Northcutt, Jr., Fanwood, N. J., assignors to Northcutt Research Corporation, New York, N. Y., a corporation of New York Application July 31, 1946, Serial No. 687,414

6 Claims. (Cl. 127—30)

This invention relates to sugar refining and especially to an improved sugar product and to a process for manufacturing it.

It is well known that the juice of the sugar cane contains several forms of sugar, namely, sucrose, dextrose, and levulose, in addition to certain salts, gums, and impurities. Sucrose is the crystallizable form of sugar and is the form used in the manufacture of granulated sugar, lump sugar, and powdered sugar. The crystallized sucrose is dry and stable, and does not deteriorate and hence may be packaged in any convenient manner and will keep indefinitely. It has always been thought that pure sucrose was the only sugar product which could be used as commercial sugar and it is for this reason that the complicated and expensive process of separating the sucrose from the other constituents of the cane juice is carried out.

Cane juice is usually separated into the crystallizable sucrose and molasses, the blackstrap of commerce. A gallon of blackstrap molasses contains over nine pounds of solids and over six pounds are pure sugars. This blackstrap with its high sugar content is sold at a fraction of its value in terms of sugar and is frequently thrown away.

The pure sugar contained in the molasses is of the same value as the sucrose but is lost in the molasses by-products. This loss is a serious one. In a raw sugar factory there will be produced five gallons of blackstrap molasses containing 6.6 pounds of pure sugar for each ton of sugar cane ground. A representative factory will grind many tons of sugar cane per hour and the raw sugar product will contain an additional two per cent of unrecoverable sugar, a total loss of fourteen per cent.

The usual process of obtaining sugar from sugar cane comprises the following steps:

1. The juice is expressed from the sugar cane and clarified.
2. The juice is evaporated in a vacuum to a solution containing about 60% solids.
3. The juice is boiled in a vacuum to supersaturation.
4. The sucrose is caused to crystallize in a vacuum.
5. The solution is then put in a centrifuge and the sucrose crystals separated from the molasses.
6. The sucrose crystals are washed to remove the adhering molasses.
7. The crystals are dried and packaged.
8. The final molasses is stored or disposed of.

We have discovered that we can greatly simplify the process outlined above and at the same time produce a sugar product with not only more but all of the sugar contained in the cane juice. And the process is not limited to cane juice, but is equally applicable to any sugar solution containing sucrose alone or sucrose and invert sugars.

Accordingly it is one of the principal objects of the invention to provide a simple process of producing sugar from sugar solution which will require fewer steps with less expensive equipment than processes heretofore known.

Another object of the invention is to provide a sugar product which will include sucrose and invert sugar but which will be as dry and stable and as easily handled as pure crystalline sucrose.

Another object of the invention is to provide a process for producing sugar from sugar solution in which a greater proportion of sugar is obtained than is obtained from any process heretofore known.

Still another object of the invention is to provide a sugar product comprising minute crystals of sucrose intimately mixed with invert sugar.

Another object of the invention is to provide a process of extracting substantially all the sugar from sugar cane as a single sugar product.

Other objects of the invention will in part be obvious and will in part appear hereinafter.

Our product may contain, in addition to the sucrose, the vitamins and other useful ingredients, the invert sugars, dextrose and levulose, or all the constituents of clarified cane juice, which are not present in ordinary commercial sugar and may have either the color or the odor, or both, removed.

Our process comprises dehydrating the sugar syrup or cane juice at a rapid rate and without agitation so that there is a simultaneous drying of both sucrose and invert sugars such that normal crystallization of the sucrose cannot take place.

We may use a heated surface to carry out our dehydration process and have found a drum drier to be especially efficient for the purpose.

One arrangement of apparatus for carrying out the invention has been illustrated in the accompanying schematic drawing, in which:

Fig. 1 is an elevational view of the apparatus; and

Fig. 2 is an enlarged elevational view of the drum drier which forms part of the apparatus.

The apparatus has been shown in connection with a complete setup for producing sugar from sugar cane. It is necessarily large and may be arranged on two floors. A preliminary cane crusher 8 may be provided on the second floor to receive the cane and the partially crushed cane is passed down through a chute 9 to a mill 10 where all of the juice is expressed. This mill may be of the usual type for this purpose and has been shown as a three-roll mill. The expressed juice from the mill 10 is forced by a pump 11 through a pipe 12 to a clarifier 13 where it may be treated in any desired manner to remove the trash, and, if desired, partially to decolor and deodorize it.

From the clarifier 13, which may be on the second floor, the clarified juice may flow by gravity through a pipe 14 into a treating tank 15 mounted on the first floor with a hopper opening on the second floor so that raw sugar solution or cane juice, thin or concentrated to a syrup such as at a density of 60 Brix, may be dumped into it. Thus said treating tank 15 is adapted for the treatment of clarified or partly clarified cane juice, such as that issuing from clarifier 13, or for treating raw sugar solutions which have been relatively concentrated. Moreover this vessel may be utilized for completing the decolorization and deodorization of the sugar solution treated therein, whether it be thin cane juice or a relatively concentrated sugar solution. The treating tank 15 may be provided with a suitable agitator 16 mounted on a vertical shaft 17 journalled in bearings attached to the walls of the tank and driven through gears 18 by means of any suitable source of power, not shown. A coil of pipe 19 is provided within the tank and is arranged to be connected to a source of steam pressure (not shown), in order to heat the contents of the tank.

An outlet pipe 20 for the tank leads to a pressure pump 21 from which the syrup is delivered to a filter press 22 of suitable type, where the heated syrup is filtered to remove solid impurities. The filter press may conveniently be placed on the second floor. When the pressure rises too high in the pipe 20 leading from the pressure pump to the filter, a relief valve 23 in a by-pass line 24 leading back to the treating tank 15 opens and permits the syrup to return to the treating tank. The filtrate from the filter press 22 is delivered through an outlet pipe 25 to a storage tank 26 placed above the first floor, and may be diverted back to the treating tank 15 through a return pipe 27 by manipulating two valves 28 and 29 in the two pipes 25 and 27, respectively, if the filtrate is not clear.

From the bottom of the storage tank 26 a pipe 30 leads to a pump 31 which delivers the syrup through a delivery pipe 32 to a drier 33 mounted on the second floor.

The drier 33 may be any type of drier which will so form the liquid to be dried as to provide a large surface area per unit volume and which will apply sufficient heat fast enough to drive off the moisture in a minimum of time. We have found a drum drier to be satisfactory for this purpose and apply the liquid sugar solution to the surface of the rotating drum in a thin film, while the interior of the drum is heated by the introduction of steam or by other means. The film is allowed to remain on the drum for a part of a rotation and then removed by a suitable scraper.

We prefer to use a drum drier of the well known twin drum type with the process of the invention and have illustrated such a drier more in detail in Fig. 2. This drum drier comprises a pair of hollow steel drums 34 rotatably mounted on parallel axes. The bearings in which the drums are mounted are arranged on pipes 35 which extend through the drums, and suitable connections (not shown), are provided so that steam may be passed into the drums to heat them.

At least one pair of aligned bearings is preferably made adjustable with respect to the other so that the distance between the drum surfaces may be adjusted.

The sugar solution may be applied to the drums in various ways. In order to insure that the sugar solution remain on the drums for a large portion of their rotation, we prefer to splash or spray the solution against the lowermost surfaces of the drums, and to this end the delivery pipe 32 is arranged to deliver the solution to a pan 36 which extends under both drums 34 and in which the level of the solution may be maintained by any suitable means, as by a float which controls the action of the pump 31 or an overflow pipe. A pair of shafts 36' are rotatably mounted, one under each drum, and parallel with the axes of the drums. These shafts are provided with projections extending out therefrom and spaced about one every inch along the length of the shaft. These shafts are rotated at an adjustable speed by any desired means, such as by the mechanism which rotates the drums, and as they rotate the projections dip into the solution and throw it by centrifugal force against the under surfaces of the drums where droplets are formed which run together into a film. By adjusting the speed of rotation of the shafts with respect to that of the drums a layer of the desired thickness may be continuously provided.

Scrapers 37 for each drum are provided having knife edges extending the length of the drum and bearing against the drum at a point on the circumference well below a horizontal plane passing through the axis of the drum.

With this arrangement the drums are rotated in opposite directions in the direction of the arrows. If the speed of the shafts is properly adjusted, each drum will receive a film of the sugar solution of the proper thickness and will thus act independently of the other drum. However, by spacing the drums so that there is a space between the adjacent surfaces of between .005 and .015 inch, this space can be used to insure the proper thickness of film on each drum regardless of the excess amount of solution splashed upon the drums by the shafts. The films of sugar solution thus applied to the drums dry while passing around the drums and will adhere to the drum surfaces until removed by the scrapers. Since the scrapers are below the horizontal centers of the drums, the dried sugar material can fall freely upon horizontally moving continuous belts 38 which are mounted beneath the scrapers on suitable rollers or pulleys and extend longitudinally of the drums for a sufficient distance to receive the material from the drums and to carry it to one end thereof. These belts may be driven in any desired manner.

At the ends of the belt the materal drops upon another continuous belt 39 mounted on pulleys or rollers beneath the first mentioned belts and substantially at right angles thereto. From this third belt, which is driven similarly to the other two, the material may fall into a hopper 40 leading to a crusher 41 which may be provided to crush out any lumps which may have formed. From the crusher the crushed material may fall into an elevating mechanism 42, the mouth of which is near the level of the first floor. This mechanism may be used to raise the material to deliver it to a mill 43 in which the particle size may be reduced as desired, and from this mill the finished product may be introduced to suitable packaging apparatus 44.

In carrying out our process with the apparatus just described the cane is first partially crushed in the preliminary crusher 8 and then more completely crushed between rollers under pressure in the press 10 and then partially clarified in the clarifier 13 by heating it with activated carbon or any other of the known materials adapted for clarification or deodorization of sugar solutions. The partially clarified juice, if desired previously concentrated to approximately 60 Brix as by evaporators of any well known type, is then delivered to the treating tank 15 which may be designed to hold about 1,200 gallons. Here, primarily if dealing with a raw sugar solution as that supplied from clarifier 13, it is heated by means of the steam coil to a temperature of approximately 200° F. to melt and dissolve the solids present, during which time the agitator operates to keep the syrup thoroughly mixed. It has been found to take about one-half hour to fill the tank and completely dissolve the contents.

Then a sugar clarifying or deodorizing material, such as activated carbon may be added to the syrup and the agitator operated for approximately 20 minutes in order to deodorize and remove the color from the syrup. About two pounds of carbon for each 100 pounds of raw sugar have been found satisfactory for this purpose.

The deodorized and decolorized syrup may then be treated with one or two per cent by weight of solids in the solution of a suitable filter aid, such as kieselguhr, for about ten minutes and the thus treated syrup delivered to the filter press 22 where any remaining solids are removed. The filtrate from the filter press is first returned to the treating tank 15 by opening the valve 29 leading thereto and closing the valve 28 leading to the storage tank 26 until the filtrate is running clear. Thereafter the valves are reversed and the clear filtrate is run into the storage tank from which the syrup may be drawn continuously for the drying step.

In order to obtain the best results from our process we prefer that the syrup be high in sucrose and low in invert sugar. Although this proportion is not critical, we have found that too much invert sugar in proportion to sucrose will produce a plastic body when the melted mass, removed from the drum, solidifies. Such a plastic mass should be avoided if a dry, easily handled, sugar product is to be produced, and we have found that it can be avoided if the levulose sugar does not exceed about ten percent by weight of the syrup.

The syrup should be quickly dehydrated so as simultaneously to dehydrate both the sucrose and the invert sugars and without any agitation, the solution remaining in a homogenous state with the sucrose in solution with the invert sugars until dry. The speed of drying should be such that normal crystallization of the sucrose cannot take place.

To satisfy the above requirements the temperature of the drums should be such that the film of syrup is maintained at a temperature above the melting point of the sucrose-invert mass and is raised to a temperature of about 275° F. by the end of its travel around the drums, although this temperature may be as high as 375° F. The temperature should not be so high as to char the sugar.

The melting temperature of the sucrose-invert mass will vary with the ratio of invert sugars to sucrose. Higher invert ratios require less temperature.

The dried mass is removed from the drying surface in a melted and homogeneous form with all sugars intimately combined. It needs no agitation, and in fact should not be disturbed, but should be allowed to cool at room temperature to a temperature below the melting temperature of the mixture, when it will solidify into a porous, spongy mass. In thus solidifying it loses a great deal of its heat in the formation of minute crystals invisible to the unaided vision.

After the mass solidifies it may be delivered by means of the continuous belts 38 and 39 to the crusher 41 where it may be crushed to the desired size for feeding to the mill or grinder 43. From the crusher the elevator may deliver the crushed material to mill or grinder 43 where it may be further divided to produce a fine uniform product which may then be passed to the packaging apparatus 44.

Our process may be beneficially employed at either the raw sugar factory, the sugar refinery, or the plantation or white sugar factory. It is necessary to install only the drum drier 33 the crushing, grinding, and packaging equipment, together with such of the apparatus preceding the drum drier as will produce from the output of some stage of the existing process a clean thin sugar syrup. If standard evaporators are already installed, then they would be used to reduce the thin juice to a density of 60 Brix or more and the final removal of moisture would be performed on the drum. Our process used in a white sugar factory, where "direct consumption first molasses" and "direct consumption first sugars" are made, as in Louisiana, will practically double the dry solids obtained from the cane and lower the cost of securing these solids. Here the yield of sugar without our invention is about 100 lbs. per ton of cane and all other sugars are left in the ten to twelve gallons of high grade molasses. (See Spencer on Sugars, 8th ed., 1945, paragraph 125, page 110.)

The new product is not plastic for more than a few seconds after it leaves the surface of the drum, even though its temperature is over 200° F., and it is not hygroscopic to any substantial degree. The crushing, milling, and packaging operations may therefore be carried out under ordinary conditions, no special air-conditioned room being necessary for this purpose.

If desired, either the decolorizing or the deodorizing treatments, or both, may be omitted without altering the handling or storing quality of the product.

The new product, according to this invention, contains all the solids contained in the original syrup, not as simple crystals, but as an agglomerate of several or all of the bodies present. It is composed of such minute crystals and these are so mingled with non-crystalline material that even in large granules no gritty taste is discernible, and it may therefore be used in any subdivisions desired, avoiding extra fine grinding which is a tedious and expensive step. The completed product may be used as any granulated sugar without change in the cooking or baking formulae.

It will be seen that conventional sugar production consists of reducing a solution of several types of sugar, sucrose, dextrose, levulose, and occasionally others, to a saturation point where, free and unhampered, and while continuously agitated, sucrose crystals are formed, and while forming, reject the mother liquor in which they are formed and this rejected mother liquor contains all the dextrose and levulose in the solution, and a corresponding amount of sucrose which will not crystallize in the presence of so much inverts.

We secure all of the sucrose and all of the inverts, without the separate crystallization of the sucrose. On the contrary, we take care to prevent the free crystallization of sucrose, and cause compound sugar crystals to form after drying, and the sucrose crystallization takes place along with the solidification and crystallization of the other sugars. The formation of sucrose in regular sugar work takes place in the presence of water. All organic crystals are formed in a fluid medium so that free movement of molecules will permit their arrangement in the typical forms of each crystallizable solid. Instead of water we cause the sugars to crystallize after freeing them from water, but while liquid because they are in their melted state.

We have found that the combined sugars while in a melted state constitute a new sucrose-dextrose-levulose relation and in such intimate relation they all crystallize at the same time and temperature, and this temperature is not that of the crystallization temperature of any one of the sugars, but another temperature which is the result of a mixture of these sugars and it is always less than that of the higher elements, and we have found they are in this respect analogous to the metallic alloys. A comparison may be shown as follows:

An alloy consisting of:

50 parts bismuth—melting point 269 C.
27 parts lead—melting point 327 C.
13 parts tin—melting point 232 C.
10 parts cadmium—melting point 321 C.

will have a melting point of the combined metals of 65 C.

A mixture of:

88 parts sucrose—melting point 186 C.
6 parts dextrose—melting point 146 C.
6 parts levulose—melting point 105 C.

will have a melting point well below 100 C.

In another way a mixture of sugars resembles an alloy: the melted mixture presents the characteristics of a pure body with new physical properties, not presented by any of the components. The solidification point, hygroscopic and heat plastic characteristics, as well as other characteristics, will not change during repeated transitions from the solid to the melted form and vice versa, as long as water or other solvent is kept away from the new sugar form. This is also true of alloys. They may be worked in any manner so long as they are not subjected to a common solvent, whereupon they will then no longer act as a composite, but as individual metals.

In order to produce this sugar-invert relation it was found necessary to remove the solvent without agitation, especially without the agitation due to vapor travel in boiling down the mixture. To do this it is necessary to perform the drying at a temperature which will always insure heat enough to insure complete solution at all times and heat high enough to exceed the melting point of the sugar mixture at final moisture removal. Then when the temperature is lowered below that point the sugar mixture at once solidifies and attempts to form crystals. The several systems of crystals are intimately combined to produce a more or less homogeneous structure different from the normal crystals of any of the components.

If water in any amount is present at the end of this drying operation, it will be used by the least soluble of the sugars to arrange its molecules in its typical crystal form, and if the amount is minute only a minute amount of individual crystals will form and if the final moisture is only one to two per cent the presence of these individual crystals will not be discernable. As long as the moisture of the dried product does not exceed about twenty-five per cent of the levulose, the practical result of the operation is not impaired: e. g., if the sugars are sucrose 88%, dextrose 6%, levulose 6%, a residual moisture of 1.5% is low enough to preserve the homogeneous structure and the product appears to the eye as free from crystals and the crystals are not discernable when eaten. When ground between the teeth, a crystalline structure or particle size larger than 1/300" in diameter is readily recognized by its gritty action on the teeth.

Average cane juice contains (Spencer, 8 ed., 1945) 14% sugars, as 12½% sucrose, .9% dextrose, .6% levulose. The sugars are present, therefore, in about the following proportion on solid basis:

| | Per cent |
|---|---|
| Sucrose | 89.3 |
| Dextrose | 6.4 |
| Levulose | 4.3 |

During the many boilings and crystallizations and recrystallizations, the invert sugar is prone to increase, but if handled in one operation the invert relation is always low enough to secure composite crystals free from objectionable sensitivity to moisture or temperature. Many tests show that an upper limit of about twelve per cent inverts is permissible. The inverts will usually be about one-half dextrose and one-half levulose, but since some variation may occur and levulose is the troublesome sugar the operation should be based on the levulose content and this should be preferably below six per cent and not above ten per cent, with a corresponding maximum range for the moisture content of 1.0% to 2.5%.

By use of these findings a syrup having an excess of invert and not practically driable as a whole, may be so adjusted by mixing with a higher sucrose syrup as to be dried in accord with our process.

While we have described our process in detail in connection with the production of sugar from cane juice or raw sugar, we desire to emphasize the fact that the process may be used for producing other sugar products than that obtainable from solutions containing dextrorotatory and levorotatory saccharides. For instance, a syrup of pure sucrose may be dried rapidly, as by means of the drums described above, without the formation of normal crystals, and the result will be a soft sugar the crystalline structure of which will be substantially absent for practical purposes and which may be used with no especially minute milling as now required for certain uses, such as for combining with chocolate, fudge, chewing gum, and the like, where crystals discernible to the taste are objectionable. Maple sap, thin or concentrated, and beet sugar solutions, properly deodorized, may be handled in practically the same manner as cane sugar solutions. Our invention therefore includes the production of a sugar product by the rapid drying of any sugar syrup without disturbing until dry enough so that normal crystallization cannot occur, and then subdividing the mass into the desired particle size.

The drum drier shown and described produces excellent results in dehydrating the sugar syrup in the desired manner. However, we do not wish to limit ourselves to the use of this particular drying apparatus, as other devices may be used to carry out the process.

A plant may be built incorporating our process for receiving sugar cane just as its comes from the fields and producing our finished sugar product in packaged form, or our process may be utilized to advantage in existing raw sugar factories, refineries, and white sugar factories with the addition of some relatively inexpensive equipment.

Since certain changes may be made in carrying out the above process and in the product, and modifications effected in the apparatus for practicing the principle thereof, without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent is:

1. The method of manufacturing an essentially non-hygyroscopic solid sugar from sugar cane juice which comprises clarifying said juice to deodorize and decolorize the same, concentrating said juice to approximately a 60% solid content, heating said juice in a thin film at a temperature within the approximate range of 275° F. to 375° F. to rapidly dehydrate the same to a moisture content not exceeding approximately 2%, whereby intervening crystallization of any ingredients of the juice is prevented and the dehydrated product is converted to a molten state, solidifying said substantially anhydrous molten sugar and grinding the same.

2. The method of manufacturing an essentially non-hygroscopic solid sugar from a natural sugar solution containing sucrose and levulose which comprises adjusting the levulose content to below approximately 10% of the sugar ingredients of the juice, exposing said juice in a thin film to a temperature sufficient to rapidly and substantially completely dehydrate said juice without intervening crystallization of any sucrose and to maintain the resultant sugar in a molten state, the temperature being sufficient to prevent crystallization of any of the sugar ingredients and below that which will char the sugar product, solidifying under atmospheric conditions said substantially anhydrous liquid sugar, and grinding the solidified product.

3. The method of manufacturing an essentially non-hygroscopic solid sugar from an aqueous sugar solution containing sucrose and invert sugar adapted to render the dehydrated product hygroscopic which comprises adjusting the invert sugar content to a concentration not exceeding approximately 12.7%, based upon the dry sugar content of the solution, concentrating said solution to a density of approximately 60 Brix, subjecting said concentrated solution to enlarged surface heating at a dehydrating temperature sufficient to rapidly dehydrate without agitation and intervening crystallization of any ingredients thereof and to maintain the substantially anhydrous product in a liquid state and below that which will char the said product, permitting the resultant substantially dehydrated sugar product to solidify, and grinding said product.

4. The method of manufacturing an essentially non-hygroscopic solid sugar from a natural aqueous sugar solution containing sucrose and invert sugar in a proportion, based upon the dry sugar content, approximating an upper limit of 12%, which comprises clarifying and deodorizing said solution, concentrating the said clarified solution to a density of approximately 60 Brix, rapidly dehydrating said solution in a thin film at a temperature preventing crystallization of any ingredients thereof and sufficient to maintain the substantially anhydrous sucrose-invert sugar product in molten state and below that which will char said product, solidifying the resultant substantially anhydrous product, and grinding the said solidified product, said solidification and grinding being under atmospheric conditions.

5. The method of manufacturing an essentially non-hygroscopic solid sugar from a natural sugar cane juice containing levulose, the upper limit of the levulose content being in the approximate range, based upon dry sugar weight, of between 6% and 10%, which comprises rapidly dehydrating said juice in a thin film to a moisture content not exceeding approximately 2.5% of the dry product at a temperature preventing crystallization of any of the ingredients thereof and sufficient to maintain the resultant substantially anhydrous product in a molten state, the temperature being below that which will char the said product, solidifying said substantially anhydrous sugar, and grinding the same, said solidification and grinding being under atmospheric conditions.

6. The method of manufacturing an essentially non-hygroscopic solid sugar product from sugar cane juice which comprises clarifying and deodorizing said juice, concentrating the said clarified juice to a density of approximately 60 Brix, heating said juice in a thin film on the surface of a rotating drum to a moisture content of less than approximately 2%, the temperature of said heating surface being sufficient to rapidly dehydrate without agitation and intervening crystallization of any ingredients in said juice and to maintain the resultant substantially anhydrous product in a molten state, said temperature not exceeding an upper limit of approximately 375° F., continuously removing dehydrated molten sugar product from said heated rotating surface, cooling to solidify the substantially anhydrous product, and grinding the same, said solidification and grinding being under atmospheric conditions.

ROBERT THOMAS NORTHCUTT.
ROBERT THOMAS NORTHCUTT, JR.

REFERENCES CITED

The following references are of record in the file of this patent:

UNITED STATES PATENTS

| Number | Name | Date |
|---|---|---|
| 1,200,116 | Johnson et al. | Oct. 3, 1916 |
| 1,512,730 | Washington | Oct. 21, 1924 |
| 1,739,064 | Dickerson | Dec. 10, 1929 |
| 1,826,701 | Ames | Oct. 13, 1931 |
| 2,089,062 | Houghland | Aug. 3, 1937 |
| 2,187,122 | Guth | Jan. 16, 1940 |
| 2,192,952 | Wolff | Mar. 12, 1940 |
| 2,391,033 | Northcutt | Dec. 18, 1945 |

OTHER REFERENCES

Mascaro, "Sugar," Nov. 1944, page 38, "On the Manufacture of Integral Sugar."

The International Sugar Journal, August 1946, page 206.